UNITED STATES PATENT OFFICE.

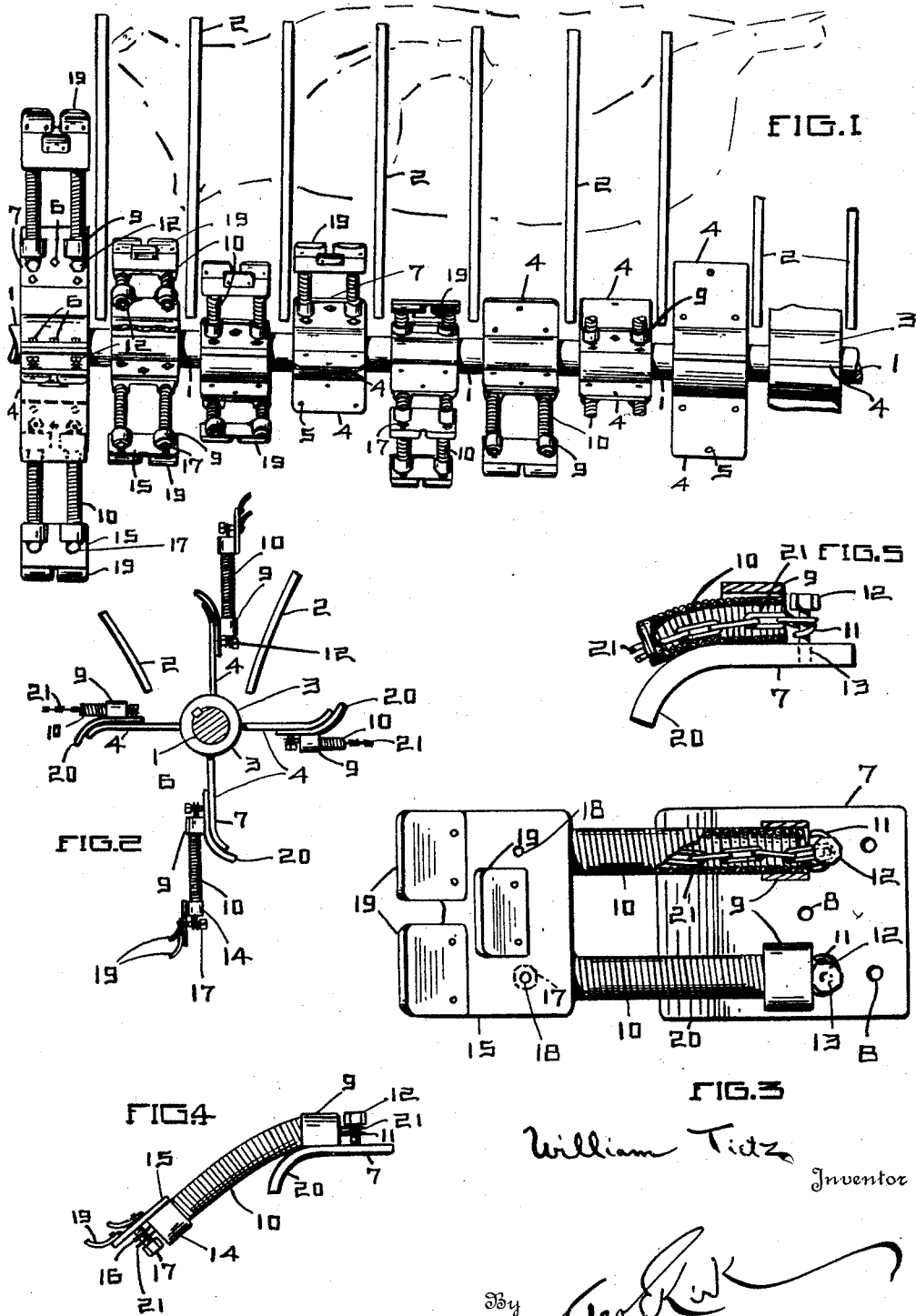

WILLIAM TIETZ, OF TOLEDO, OHIO.

DEHAIRING APPARATUS.

1,327,073. Specification of Letters Patent. Patented Jan. 6, 1920.

Application filed December 20, 1918. Serial No. 267,567.

*To all whom it may concern:*

Be it known that I, WILLIAM TIETZ, a citizen of the United States of America, residing at Toledo, Lucas county, Ohio, have invented new and useful Dehairing Apparatus, of which the following is a specification.

This invention relates to beaters or scraper tools.

This invention has utility when incorporated in connection with cleaning or polishing apparatus, more particularly the carcasses of hogs.

Referring to the drawings:

Figure 1 is a fragmentary view of a hog dehairer equipped with the apparatus of the invention herein;

Fig. 2 is a section through the shaft of the dehairer of Fig. 1, showing the mounting of the tools;

Fig. 3 is a detail view in plan of the scraper unit; parts being broken away to show the slacked chain;

Fig. 4 is a side elevation, on a reduced scale, of the scraper unit of Fig. 3, with the unit in flexed position; and Fig. 5 is a fragmentary view showing the chain brought to taut position in the flexing of the helical spring between the tool and the mounting member.

The driving shaft 1 in practice may be desirably slightly inclined for automatically progressing the hog carcasses along thereover between forks 2 of the skeleton trough. Fast with the shaft 1 are hubs 3 having radially extending arms 4 providing terminal seats with bolt holes 5 in which bolts 6 may enter for firmly anchoring mounting members 7 in position therewith. The members 7 have holes 8 for the bolts 6.

The members 7 are also provided with a pair of cylindrical seats 9 serving as guides for terminals of helical springs 10, hook ends 11 of which springs 10 engage bolts 12 seated in bolt holes 13 in the member 7 adjacent the holes 8. The helical springs 10 in their extent away from the member 7 have their remote ends enter seats 14, similar to the seats 9. These seats 14 are in tool 15. Hook ends 16 of the springs 10 by engaging bolts 17 in holes 18 of the tool 15 maintain the springs 10 in assembled relation as flexible connecting means between the member 7 and the tool 15.

The tool 15 is herein shown as designed for dehairing and polishing hog carcasses and is equipped with three staggered scraping edges 19 for such purpose, which in the rotation of the shaft 1 say at 150 R P M, are effective in tossing and rolling the carcass, flexing in thereabout to configure for efficient pulling or dehairing action. Notwithstanding the speed of rotation and the frequency and number of the tool or scraper units, there is concussion and load strain, and the life of the unit is made the life of the tool terminus, by distributing the flexing and restricting its range to well within the elastic limit of the unit. In order that sudden excessive load may not localize flexing for a too abrupt bending adjacent the seats 9, the member 7 is provided with a curved extension 20 which is rigid in distributing any flexing away from the member 7. While in the high speed of rotation there may be some slight tendency of the tool 15 due to its weight to distend the springs 10, the checking thereof may be desirable, but chains 21, incased by the springs 10, and when the springs are straight, normally slack between the bolts 12 and 17, have their great function in being drawn taut as the springs 10 flex. This drawing taut of the chains 21 upon the desired flexing limit being reached by the spring 10, at this restricted range converts the flexing unit into a rigid structure in its operating direction, within the elastic limit of the springs 10, and the reflex action has its releasing toss action for smoothing down the handling of the carcass as well as efficiently scraping such carcass.

This all metal unit, with such protective coating as may be desirable in the apparatus, is not open to serious disintegration attack from the scalding liquids used on the carcasses, and there is thus produced a simple apparatus of strength and permanence. The member 15 is assembled opposite the member 7 by the springs 10.

What is claimed and it is desired to secure by Letters Patent is:

1. A rotary driving shaft, a holder mounted thereon having an arm provided with a tool terminus and an intermediate resilient section, and means in a resilient section for limiting the flexing thereof.

2. A rotary driving shaft, a hub mounted thereon and provided with a plurality of arms having seats, mounting members anchored to the seats, tool means, springs connecting the tool means to the mounting members, and additional means connecting the tool means and members for limiting the flexing of the springs.

3. A rotatably carried mounting member, a tool, and spring and chain connecting means between the member and tool, the former permitting lateral yielding and the latter limiting the extent of such yielding.

4. A hog scraper tool, a mounting member therefor, and flexible connecting means between the tool and member, said member having rigid means coacting with the connecting means to distribute the flexing thereof away from the member, said tool, connecting means and member comprising a unit, a rotary shaft, and a hub on the shaft provided with an arm having a seat for the mounting member of the unit.

5. A hog dehairer comprising a rotary shaft having series of seats, mounting members anchored to said seats, scraper tools, spring means between the tools and members, and means limiting the flexing of the spring means.

6. A hog dehairer tool unit comprising a scraper, a mounting member, a pair of helical springs therebetween, and means for determining a restricted range of flexing for said springs.

7. A hog dehairer tool unit comprising a scraper, a mounting member, a pair of helical springs therebetween, and spring flexing restricting means comprising a chain between the scraper and member slacked in straight position to permit some flexing, said member being configured to distribute spring flexing therefrom.

In witness whereof I affix my signature.

WM. TIETZ.